(12) United States Patent
Byer

(10) Patent No.: US 10,041,703 B2
(45) Date of Patent: Aug. 7, 2018

(54) FIELD INSTRUMENT TEMPERATURE APPARATUS AND RELATED METHODS

(71) Applicant: Fisher Controls International LLC, Marshalltown, IA (US)

(72) Inventor: Mark Byer, Marshalltown, IA (US)

(73) Assignee: Fisher Controls International LLC, Marshalltown, IA (US)

( * ) Notice: Subject to any disclaimer, the term of this patent is extended or adjusted under 35 U.S.C. 154(b) by 234 days.

(21) Appl. No.: 14/495,568

(22) Filed: Sep. 24, 2014

(65) Prior Publication Data

US 2016/0084538 A1 Mar. 24, 2016

(51) Int. Cl.
*F25B 9/04* (2006.01)
*G01K 13/02* (2006.01)
*G05D 23/19* (2006.01)

(52) U.S. Cl.
CPC ............... *F25B 9/04* (2013.01); *G01K 13/02* (2013.01); *G05D 23/1919* (2013.01)

(58) Field of Classification Search
CPC ... H01L 21/26513; H01L 21/84; G01R 33/16; G01N 35/026; G01N 1/28; G05D 7/01; G01K 13/02; F25B 9/04
USPC .................. 324/252, 200, 250, 403–407, 87; 165/109.1, 109.17
See application file for complete search history.

(56) References Cited

U.S. PATENT DOCUMENTS

| | | |
|---|---|---|
| 1,952,281 A | 3/1934 | Ranque |
| 2,737,028 A | 3/1956 | Machlanski |
| 2,749,925 A | 6/1956 | Long |
| 3,019,621 A | 2/1962 | Lawson |
| 3,165,149 A | 1/1965 | Raible et al. |
| 3,285,055 A | 11/1966 | Reinecke |
| 3,307,366 A | 3/1967 | Smith |
| 3,684,237 A | 8/1972 | Hyde et al. |
| 4,112,977 A | 9/1978 | Syred et al. |
| 4,132,247 A | 1/1979 | Lindberg |
| 4,232,657 A | 11/1980 | Killorin |

(Continued)

FOREIGN PATENT DOCUMENTS

| | | |
|---|---|---|
| DE | 2130601 | 1/1973 |
| FR | 2759146 | 8/1998 |

OTHER PUBLICATIONS

International Searching Authority, International Search Report and Written Opinion, issued in connection with International Application No. PCT/US2014/044011, dated Sep. 12, 2014, 9 pages.

(Continued)

*Primary Examiner* — Melissa Koval
*Assistant Examiner* — Trung Nguyen
(74) *Attorney, Agent, or Firm* — Hanley, Flight & Zimmerman, LLC

(57) ABSTRACT

Example field instrument temperature apparatus and methods for affecting or regulating a temperature of a field instrument are disclosed. An example apparatus includes a vortex tube having an inlet to receive a fluid, a first outlet to dispense a first portion of the fluid at a first temperature and a second outlet to dispense a second portion of the fluid at a second temperature, the second temperature being greater than the first temperature. The example apparatus also includes a first passageway fluidly coupled to the first outlet to direct the first portion of the fluid to an electronic device in a process control system to affect a temperature of the device.

19 Claims, 8 Drawing Sheets

(56) References Cited

U.S. PATENT DOCUMENTS

| | | | |
|---|---|---|---|
| 4,877,059 A | 10/1989 | Popescu et al. | |
| 5,322,043 A | 6/1994 | Shriner et al. | |
| 5,327,728 A | 7/1994 | Tunkel | |
| 5,335,503 A | 8/1994 | Lee | |
| 5,582,012 A | 12/1996 | Tunkel et al. | |
| 5,603,746 A | 2/1997 | Sharan | |
| 5,682,749 A | 11/1997 | Bristow et al. | |
| 6,082,116 A | 7/2000 | Tunkel et al. | |
| 6,156,114 A * | 12/2000 | Bell | B01J 8/0015 106/400 |
| RE37,922 E | 12/2002 | Sharan | |
| 7,234,489 B2 | 6/2007 | Bowe et al. | |
| 9,599,372 B2 * | 3/2017 | Bancroft | F25B 9/04 |
| 2004/0216785 A1 | 11/2004 | Bowe et al. | |
| 2005/0045033 A1 | 3/2005 | Nicol et al. | |
| 2008/0060708 A1 | 3/2008 | Benda | |
| 2008/0115507 A1 | 5/2008 | Blomkvist | |
| 2011/0120677 A1 * | 5/2011 | Oh | F25B 9/04 165/109.1 |
| 2011/0186300 A1 * | 8/2011 | Dykstra | E21B 34/08 166/316 |
| 2013/0174551 A1 * | 7/2013 | Mahmoud | F01K 25/06 60/649 |
| 2014/0373951 A1 | 12/2014 | Griffin, Jr. et al. | |
| 2015/0027507 A1 * | 1/2015 | Noui-Mehidi | E21B 41/0085 136/201 |
| 2016/0085244 A1 | 3/2016 | Jackson | |

OTHER PUBLICATIONS

International Searching Authority, "International Preliminary Report on Patentability," issued in connection with international application No. PCT/US2014/044011, dated Dec. 29, 2015, 6 pages.
Patent Cooperation Treaty, International Search Report of the International Searching Authority, issued in connection with international application No. PCT/US2015/051816, dated Jan. 27, 2016, 3 pages.
Patent Cooperation Treaty, "Written Opinion of the International Searching Authority," issued in connection with international application No. PCT/US2015/051816, dated Jan. 27, 2016, 6 pages.
United States Patent and Trademark Office, "Non-final office action," issued in connection with U.S. Appl. No. 13/926,687 dated Mar. 10, 2016, 25 pages.
Office Action, issued by the United States Patent and Trademark Office in connection with U.S. Appl. No. 13/926,687, dated May 21, 2015, 13 pages.
United States Patent and Trademark Office, "Final Office Action," issued in connection with U.S. Appl. No. 13/926,687, dated Nov. 9, 2015, 18 pages.
International Searching Authority, "International Search Report," issued in connection with International Application No. PCT/US2015/051810, dated Dec. 3, 2015, 6 pages.
International Searching Authority, "Written Opinion," issued in connection with International Application No. PCT/US2015/051810, dated Dec. 3, 2015, 7 pages.
United States Patent and Trademark Office, "Non-Final Office Action," issued in connection with U.S. Appl. No. 14/495,579, dated Oct. 18, 2016, 45 pages.
Fisher Controls, "Hilsch Vortex Tube," Bulletin K-8B (1956), 2 pages.
Gas Research Institute, "Vortex Tube Experiment Final Report," GRI-03/0171 (Oct. 2003), 154 pages.
United States Patent and Trademark Office, "Final Office Action," issued in connection with U.S. Appl. No. 14/495,579 dated May 5, 2017, 26 pages.
United States Patent and Trademark Office, "Notice of Allowance and Fee(s) Due," issued in connection ith U.S. Appl. No. 13/926,687, dated Dec. 19, 2016, 18 pages.
United States Patent and Trademark Office, "Advisory Action," issued in connection with U.S. Appl. No. 13/926,687, dated Nov. 9, 2016, 9 pages.
United States Patent and Trademark Office, "Restriction and/or Election Requirement," issued in connection with U.S. Appl. No. 14/495,579, dated Jul. 26, 2016, 9 pages.
United States Patent and Trademark Office, "Final Office Action," issued in connection with U.S. Appl. No. 13/926,687, dated Jul. 27, 2016, 31 pages.
United States Patent and Trademark Office, "Non-Final Office Action," issued in connection with U.S. Appl. No. 15/463,378, dated Dec. 28, 2017, 20 pages.
United States Patent and Trademark Office, "Advisory Action," issued in connection with U.S. Appl. No. 14/495,579, dated Aug. 18, 2017, 13 pages.
State Intellectual Property Office of People's Republic of China, "First Office Action," issued in connection with Chinese Patent Application 201410281310.5, dated Jun. 2, 2017, 13 pages.
State Intellectual Property Office of People's Republic of China, "Search Report," issued in connection with Chinese Patent Application 201410281310.5, dated May 24, 2017, 2 pages.

* cited by examiner

FIELD INSTRUMENT TEMPERATURE APPARATUS AND RELATED METHODS

FIELD OF THE DISCLOSURE

This disclosure relates generally to field instruments and, more particularly, to field instrument temperature apparatus and related methods.

BACKGROUND

Process control systems, like those used in chemical, petroleum and/or other processes, typically include one or more field instruments or devices for measuring and/or controlling different aspects of the process control system. Field devices may include, for example, sensors, switches, transmitters, valve controllers, etc., that perform process control functions such as level sensing, temperature sensing, valve control operations, etc.

Field devices typically have an operating temperature or operating temperature range that defines the temperature(s) at which the device operates most effectively. For example, a field device may have an operating temperature range of −52° C. to 85° C. If the field device is exposed to temperatures outside of this range, the operability and/or operating life of the field device decreases. Some field devices such as, for example, electronic field devices, are particularly susceptible to temperatures outside of their operating temperature range. For example, digital valve controllers, pressure transducers and other digital sensors typically have elastomeric moving parts, and when these field devices are exposed to temperatures that are outside of their operating temperature range, the elastomeric parts suffer increased wear and, thus, the operating life of the field device is reduced.

Many process control systems are located outdoors. As a result, the field devices of the process control system are exposed to the climate/environment where the process control system is located. In some locations, this results in exposure to climates that produce relatively high and/or low temperatures. Therefore, field devices that have operating temperature ranges that do not cover the range of temperatures at the process control plant are likely to suffer increased wear and, thus, decreased operating lifespan.

Figure 1:
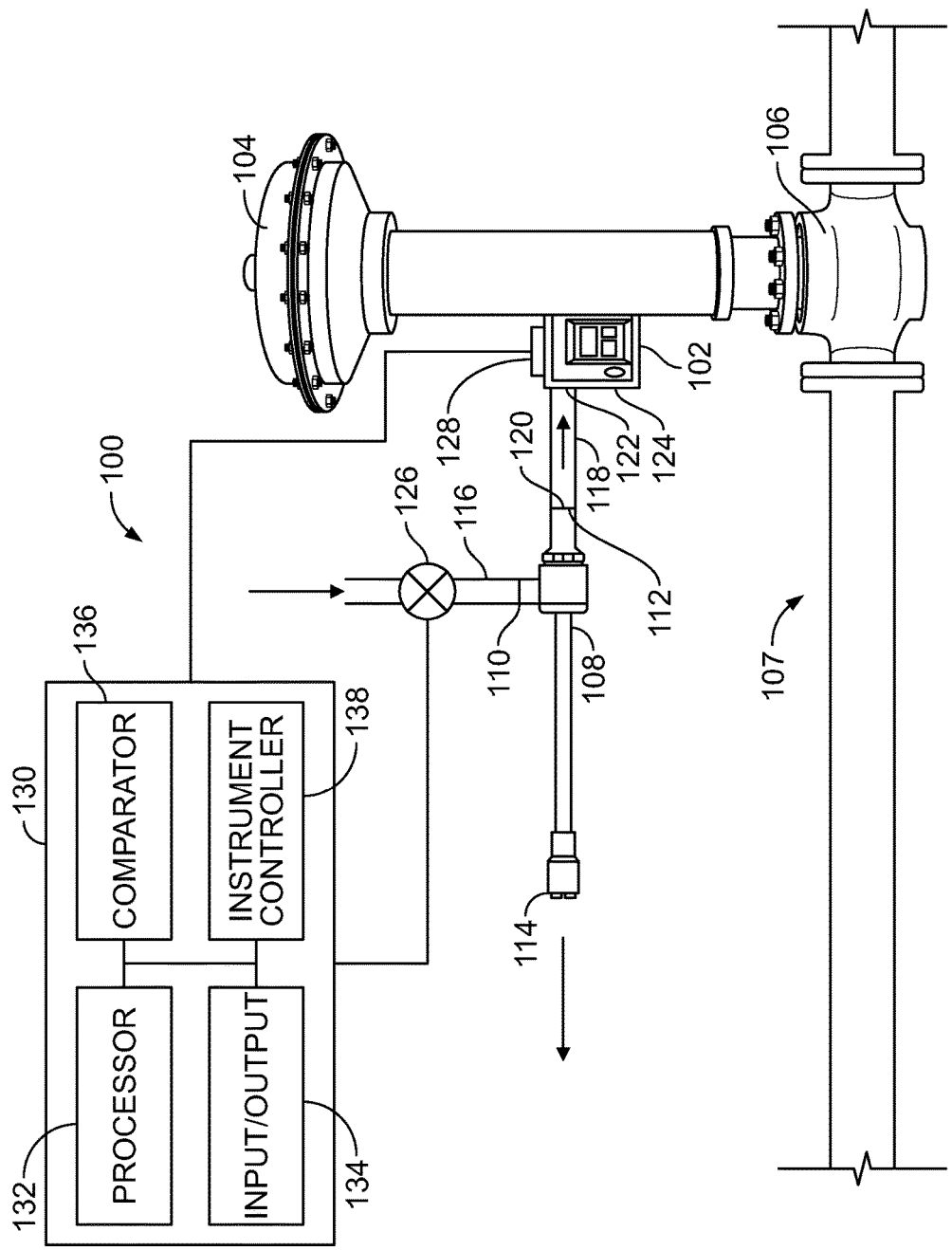
FIG. 1 is a schematic view of an example field device temperature apparatus employed with an example valve and actuator in accordance with the teachings of this disclosure.

The figures are not to scale. Instead, to clarify multiple layers and regions, the thickness of the layers may be enlarged in the drawings. Wherever possible, the same reference numbers will be used throughout the drawing(s) and accompanying written description to refer to the same or like parts. As used herein, the terms "coupled" and "operatively coupled" are defined as connected directly or indirectly (e.g., through one or more intervening structures and/or layers).

SUMMARY

An example apparatus disclosed herein includes a vortex tube having an inlet to receive a fluid, a first outlet to dispense a first portion of the fluid at a first temperature and a second outlet to dispense a second portion of the fluid at a second temperature, the second temperature being greater than the first temperature. The example apparatus also includes a first passageway fluidly coupled to the first outlet to direct the first portion of the fluid to an electronic device in a process control system to affect a temperature of the device.

Another example apparatus disclosed herein includes a housing to contain an electronic device of a process control system, a vortex tube that is to divert a first portion of a fluid to a first outlet of the vortex tube and a second portion of the fluid to a second outlet of the vortex tube and a first passageway to fluidly couple the first outlet to the housing to supply the first portion of the fluid to an internal cavity of the housing.

An example method disclosed herein includes measuring a first temperature proximate a field instrument in a process control system, comparing the first temperature to a first threshold and operating a vortex tube to supply fluid at a second temperature to the field instrument when the first temperature is above the first threshold, the second temperature being lower than the first temperature. In the example method, the vortex tube comprises an inlet that is to receive the fluid, a first outlet that is to dispense a first portion of the fluid at the second temperature, and a second outlet that is to dispense a second portion of the fluid at a third temperature, the third temperature being higher than the second temperature.

DETAILED DESCRIPTION

Field instruments or devices (e.g., control devices) such as, for example, sensors, switches, transmitters, valve controllers, etc. are used throughout a process control system to measure and control different aspects (e.g., other process control devices) of the process control system. These field devices typically have temperature ranges in which they operate most effectively. For example, the field device may have an upper operating temperature limit or threshold (e.g., 85 degrees Celsius (° C.)) and/or a lower temperature operating limit or threshold (e.g., −52° C.). While a field device may be able to operate in a temperature outside of its operating temperature range, exposure to such temperature(s) greatly decreases the effectiveness of the field device and often decreases the operating lifespan of the field device. For example, some field devices, such as electronic field devices, have internal elastomeric components (e.g., a dielectric elastomer transducer). When these components are exposed to temperatures outside of the operating temperature range of the respective field device, the amount of wear and damage to these components increases. Thus, over time, the effectiveness of the field device decreases and the operating lifespan is reduced.

To overcome this problem, some known systems employ electric heaters or coolers to maintain the field device closer to or within its operating temperature range. However, utilizing such electric heaters or coolers requires an electrical power supply at or near each of the field devices. Therefore, a large amount of wiring and electrical power is needed throughout the entire processing plant to operate these types of electric heaters and coolers. Further, electric heaters and coolers are relatively inefficient and typically require a large amount of electrical energy to operate.

Example field device temperature apparatus disclosed herein relate to field instruments or devices and, more specifically, to cooling and/or heating a field device to control a temperature at which the field device is operating. In general, the example temperature apparatus disclosed herein utilize a vortex tube or vortex generator to supply streams of relatively warm or relatively cool air to a field device to prevent or reduce the amount of time the field device operates at a temperature outside of its temperature operating range. As a result, less wear and damage occurs to the field device and, thus, the effectiveness of the field device remains high and the operating lifespan (e.g., field life) of the field device increases. Additionally, by utilizing the temperature apparatus disclosed herein, the field device may be used in climates or conditions that would typically subject the field device to temperatures outside of its operating temperature range. Therefore, the example field device temperature apparatus can be used in more applications (e.g., in climates temperatures outside of normal operating temperature range). Further, the example field device temperature apparatus disclosed herein are capable of operating using compressed gas (e.g., plant air), which is commonly routed through a process control system. Thus, in some examples, the field device temperature apparatus disclosed herein do not require heavy electrical supplies such as those needed with electric heaters or coolers.

An example field device temperature apparatus disclosed herein uses a vortex tube or vortex generator to generate relatively warmer and relatively cooler streams of fluid (e.g., air or another gas) that are ducted to the field device to affect (e.g., increase and/or decrease) the temperature at and/or around the field device. A vortex tube is a mechanical device that receives a stream of compressed fluid (e.g., air) and splits the fluid into a first stream that has a temperature that is lower than the incoming fluid and a second stream that has a temperature that is higher than the incoming fluid. In the examples disclosed herein, a first outlet of the vortex tube, which ejects or dispenses the relatively cooler stream of fluid, is fluidly coupled to the field device. Therefore, when the field device is exposed to temperatures that exceed its upper operating temperature limit, the stream of relatively cooler fluid is used to cool or reduce the temperature of the field device. Additionally or alternatively, a second outlet of the vortex tube, which ejects or dispenses the relatively warmer stream of fluid, is also fluidly coupled to the field device. Thus, when the field device is exposed to temperatures below its lower operating temperature limit, the relatively warmer fluid is used to warm or increase the temperature of the field device. As a result, the field device is capable of operating in temperatures that are outside of its operating temperature range.

In some examples, the vortex tube of the example field device temperature apparatus may be adjusted (e.g., via a valve or plug at the second outlet) to affect the flow rates of the streams of fluid at the first and second outlets and, thus, the temperatures of the streams of fluid at the first and second outlets. Changing the flow rate at the second outlet, for example, affects the flow rate at the first outlet, as well as the temperature of the streams of fluid ejected from the outlets. For example, decreasing the flow rate of the warm fluid stream at the second outlet results in an increased flow rate of the cold fluid stream at the first outlet, which also results in a decreased temperature of the cold stream of fluid at the first outlet.

In some example field device temperature apparatus disclosed herein, the streams of relatively warmer or relatively cooler fluid from the vortex tube are ducted to a housing or container that contains the field device. In such examples, the container acts as a barrier to help retain the fluid closer to the field device. In some examples, the container includes insulation to increase the efficiency with which the relatively warm or relatively cool fluid proximate the field device can control the temperature of the field device (i.e., decrease the effect of the local ambient temperature on the ability of the fluid to heat or cool the field device). An example insulation disclosed herein utilizes a layer of aerogel coupled (e.g., sandwiched) between two rigid layers of polyimide. In some examples, the container is coated with a conductive insulating layer (e.g., neoprene) so that the container can be grounded, which reduces the risk of undesired sparks and/or static interference with the electronics of the field device. As a result, the field device can be used in more hazardous atmosphere environments.

Advantageously, the vortex tubes of the disclosed apparatus do not require electrical power. Instead, vortex tubes operate using compressed or pressurized fluid that is supplied to an inlet of the vortex tube. In some example field device temperature apparatus disclosed herein, compressed fluid is supplied by or bled from other compressed fluid (e.g., air) sources in the process control system. For example, process control systems typically include instruments and other equipment that operate using compressed air such as, for example, pneumatic valve actuators. Thus, compressed air supply lines are commonly routed throughout a process control system and, thus, are readily available within the processing plant. Therefore, in some examples disclosed herein, compressed air (e.g., plant air) is used to supply the compressed fluid to the vortex tube. Additionally, it is to be understood that the field device temperature apparatus and methods disclosed herein may be implemented on any type of field device (e.g., sensors, switches, valve controllers, etc.).

Turning now to the figures, FIG. 1 illustrates an example field device temperature apparatus 100 disclosed herein for affecting (e.g., controlling, changing, regulating) the temperature at and/or near a field device 102 (e.g., a control device). In the illustrated example, the field device 102 is an electronic valve controller and is coupled to an actuator 104 of a valve 106 (e.g., a pneumatic valve) that is installed in a fluid process system 107 (e.g., a distribution piping system) of a processing system or plant. The field device 102 measures one or more parameters of the actuator 104 and/or the valve 106 (e.g., the position of the valve) and/or controls one or more parameters of the actuator 104 and/or the valve 106. The field device 102 has an optimum or operating temperature range at which the field device 102 operates most effectively. For example, the operating temperature range includes an upper operating temperature limit and/or a lower operating temperature limit. When the temperature of the ambient or surrounding air increases beyond the upper operating temperature limit, the components of the field device 102 suffer increased wear. For example, the field device 102 may include a dielectric elastomer transducer, which is susceptible to increased wear when operating in a temperature above the upper operating temperature limit.

To cool or reduce (e.g., affect) the temperature of the field device 102, the example temperature apparatus 100 includes a vortex tube or vortex generator 108. In general, a vortex tube (or Ranque-Hilsch vortex tube) is a device that separates compressed fluid (e.g., gas) into relatively warmer and cooler streams. In operation, pressurized fluid is injected tangentially into a swirl chamber in the vortex tube and is accelerated to a higher rate of rotation. When the rotating fluid reaches one end of the vortex tube, the outer boundary of fluid, which is relatively warmer, is routed past a conical nozzle and exits (e.g., is dispensed) through the end of the tube as a stream of relatively warmer fluid. The fluid traveling closer to the center of the tube is diverted (e.g., via the conical nozzle) back through the tube and exits (e.g., is dispensed) through the other end of the tube as a relatively cooler stream of the fluid.

In the illustrated example, the vortex tube 108 has an inlet 110, a first outlet 112 and a second outlet 114. The inlet 110 receives a stream of fluid (e.g., pressurized or compressed fluid) at a certain temperature and converts the fluid into a relatively cooler stream of fluid at the first outlet 112 and a relatively warmer stream of fluid at the second outlet 114. In other words, a first portion of the compressed fluid that enters the inlet 110 is diverted to the first outlet 112 and exits (e.g., is dispensed by) the first outlet 112 at a lower temperature than the compressed fluid that entered the inlet 110, and a second portion of the compressed fluid that enters the inlet 110 is diverted to the second outlet 114 and exits (e.g., is dispensed by) the second outlet 114 at a higher temperature than the fluid that entered the inlet 110.

To supply pressurized or compressed fluid to the vortex tube 108, a conduit or passageway 116 is coupled to the inlet 110 of the vortex tube 108. The compressed fluid may be provided by a compressor or other compressed fluid source. In some examples, as disclosed above, compressed gas or air (e.g., plant air) is commonly routed throughout a process control system or plant. In such examples, the passageway 116 fluidly couples the inlet 110 of the vortex tube 108 to a piping system that delivers the compressed air throughout the process control system or plant.

In the illustrated example, the temperature apparatus 100 includes a conduit or passageway 118 coupled between the first outlet 112 and the field device 102. The passageway 118 fluidly couples the first outlet 112 and the field device 102 to supply (e.g., direct) the relatively cooler fluid (e.g., the first portion of the fluid) generated by the vortex tube 108 to the field device 102 to cool or reduce the temperature of the field device 102. In the illustrated example, the passageway 118 has a first end 120 and a second end 122. The first end 120 of the passageway 118 is coupled to the first outlet 112 and the second end 122 of the passageway 118 is coupled to a casing or housing 124 of the field device 102. In some examples, a hole or aperture is provided on the housing 124 of the field device 102 to receive the second end 122 of the passageway 118, such that the relatively cooler fluid is provided directly into an internal compartment of the field device 102. In other examples, the second end 122 of the passageway 118 is positioned or located to direct the relatively cooler fluid at and/or or across the housing 124 of the field device 102 to reduce the temperature of the field device 102.

To control and/or regulate the amount of fluid provided to the vortex tube 108 and, thus, to the field device 102, a flow control member 126 is disposed in the passageway 116 upstream from the inlet 110. The flow control member 126 may be implemented as a shut-off valve and/or pressure-reducing valve to control and/or regulate the flow and/or the pressure of the compressed fluid supplied to the inlet 110 of the vortex tube 108. In some examples, the flow control member 126 regulates (e.g., reduces) the pressure of the compressed fluid to a pre-set or predetermined pressure value prior to supplying the compressed fluid to the vortex tube 108. In other examples, the flow control member 126 is not utilized, and compressed fluid is constantly supplied to the vortex tube 108.

In the illustrated example of FIG. 1, a temperature sensor 128 is employed to measure the temperature at and/or around the field device 102. In some examples, the temperature sensor 128 is integrated into the field device 102. For example, some field devices include an internal temperature sensor or thermostat, and the thermostat is employed to sense the temperature at and/or around the field device 102. When the temperature of the ambient or surrounding air reaches a threshold (e.g., at or near the upper operating temperature limit), the example temperature apparatus 100 operates to supply relatively cooler fluid to the field device 102 to reduce the temperature at and/or around the field device 102 and, thus, reduce the amount of wear incurred by the field device 102.

To control and/or operate the vortex tube 108 to supply cool air to the field device 102, the example temperature apparatus 100 may employ a control system 130. In the illustrated example, the control system 130 includes a processor 132 (e.g., a microprocessor), an input/output module 134, a comparator 136, and an instrument controller 138. For example, the temperature sensor 128 may provide a signal (corresponding to a temperature at and/or around the field device 102) to the processor 132 via the input/output module 134. The control system 130 may determine if the temperature measured by the temperature sensor 128 is below a pre-determined value or threshold (e.g., the upper operating temperature limit or other temperature value) for the field device 102. For example, the comparator 138 may compare the signal provided by the temperature sensor 128 with a threshold provided by, for example, reference data (e.g., a look-up table). For example, some field devices have an upper operating temperature limit of 85° C. If the temperature at or around the field device 102 increases above that limit, (e.g., 88° C.), the control system 130 may cause the flow control member 126 to open and supply the compressed fluid to the vortex tube 108, which generates a stream of relatively cooler compressed air that is ducted via the passageway 118 to the field device 102. In other examples, the threshold is set to other values such as, for example, below the upper operating temperature limit (e.g., 75° C.). Thus, in some examples, the control system 130 causes the flow control member 126 to operate between an open and closed position to restrict the flow of compressed fluid through the vortex tube 108.

In some examples, the temperature sensor 128 continues to detect or measure the temperature at and/or around the field device 102. After a period of time, the temperature at and/or near the field device 102 may decrease to a temperature value below the threshold. In some examples, the comparator 138 may compare the signal provided by the temperature sensor 128 with the temperature threshold. If the temperature at and/or around the field device 102 decreases to a set amount below the limit (e.g., 80° C.), the control system 130 may cause the flow control member 126 to close and cease supplying cooler fluid to the field device. Thus, the temperature apparatus 100 may be used to regulate (e.g., maintain the temperature at and/or near the field device within a set range) the temperature at the field device 102.

In some examples, the vortex tube 108 may be adjusted to affect the flow rates of the streams of fluid at the first and second outlets 112, 114 and, thus, the temperature of the streams of fluid dispensed from the first and second outlets 112, 114. For example, the vortex tube 108 may include a valve (e.g., a plug) at the second outlet 114 that may be adjusted to increase or decrease the flow rate of the fluid stream at the second outlet 114. Changing the flow rate at the second outlet 114, for example, affects the flow rate at the first outlet 112, as well as the temperature of the streams of fluid ejected from the first and second outlets 112, 114. In some examples, the flow rates at the first and second outlets 112, 114 may be preset (e.g., by pre-setting a valve at the second outlet 114 to a certain position) to provide the maximum hot and/or cold temperatures at the first and second outlets 112, 114. Additionally or alternatively, the vortex tube 108 may be adjusted automatically (e.g., via a controller that adjusts a valve at the second outlet 114) to change the flow rates of the streams of fluid at the first and second outlets 112, 114 and, thus, the temperatures of the streams of fluid at the first and second outlets 112, 114.

In the illustrated example, the field device 102 is an electronic valve controller. However, it is to be understood that the field device 102 may be any type of field device such as, for example, a pressure transducer, a temperature regulator, etc. In some examples, the control system 130 is incorporated into the field device 102, such that the field device 102 controls the operations of the vortex tube 108. In other examples, the control system 130 may be located in a remote location such as, for example, in a central control room of the processing system or plant.

Figure 2:
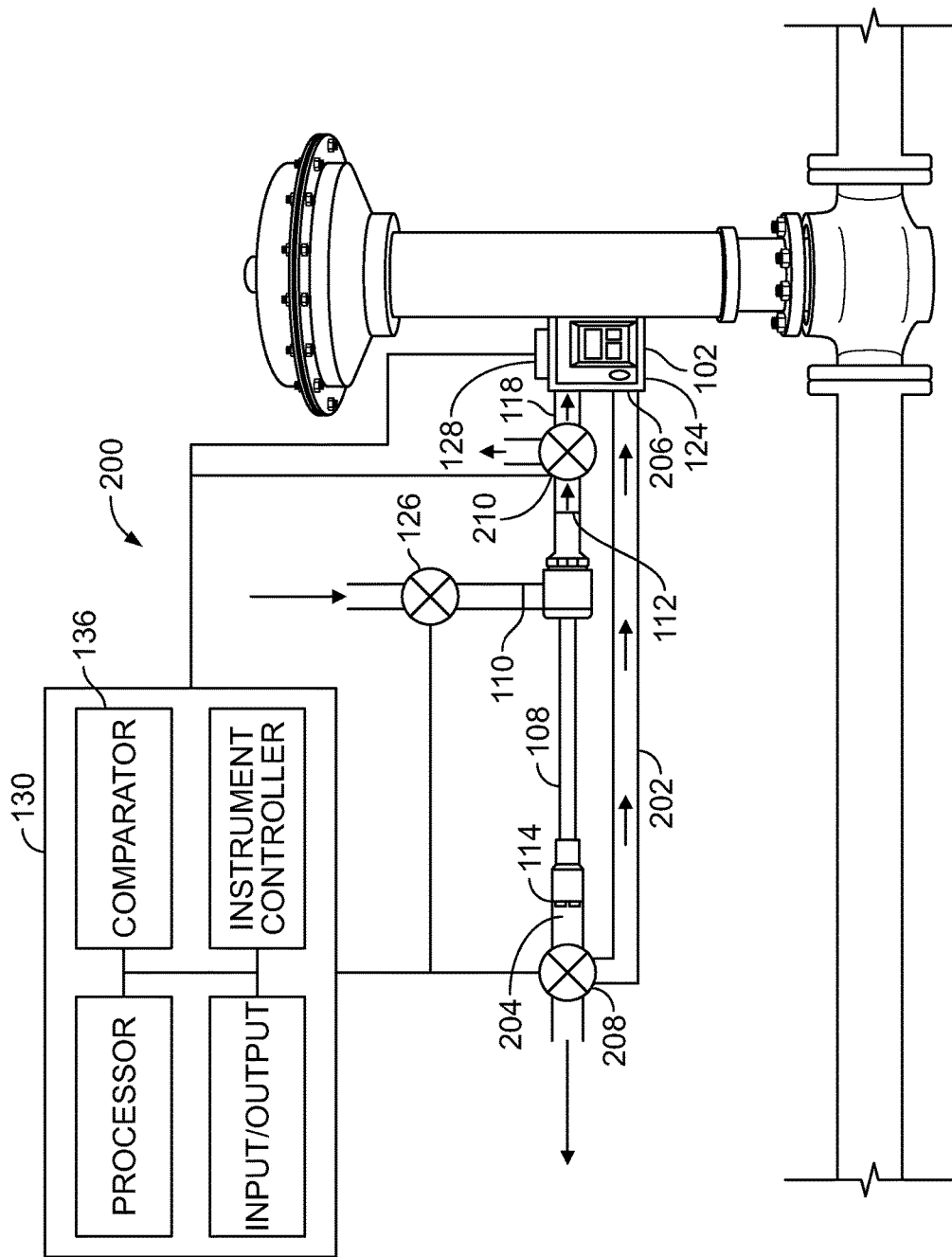
FIG. 2 is a schematic view of another example field device temperature apparatus disclosed herein.

FIG. 2 illustrates another example temperature apparatus 200 described herein. Those components of the example temperature apparatus 200 that are substantially similar or identical to the components of the example temperature apparatus 100 described above and that have functions substantially similar or identical to the functions of those components will not be described in detail again below. Instead, the interested reader is referred to the above corresponding descriptions. To facilitate this process, the same reference numbers will be used for like structures.

Referring to FIG. 2, the example temperature apparatus 200 includes a conduit or passageway 202 coupled between the second outlet 114 and the field device 102. The passageway 202 fluidly couples the second outlet 114 and the field device 102 to supply the relatively warmer fluid (e.g., the second portion of the fluid) generated by the vortex tube 108 to the field device 102 to warm or increase the temperature of the field device 102. In the illustrated example, the passageway 202 has a first end 204 and a second end 206. The first end 204 of the passageway 202 is coupled to the second outlet 114 and the second end 206 of the passageway 202 is coupled to the housing 124 of the field device 102. In some examples, a hole or aperture is provided on the housing 124 of the field device 102 to receive the second end 206 of the passageway 202, such that the relatively warmer fluid is provided directly to an internal compartment of the field device 102. In other examples, the second end 206 of the passageway 202 is positioned or located to direct the relatively warmer fluid at and/or or across the housing 124 of the field device. Therefore, in the illustrated example of FIG. 2, the temperature apparatus 200 may operate to supply relatively cooler fluid and/or relatively warmer fluid to the field device 102 to change the temperature of the field device 102. For example, if the temperature measured by the sensor 128 is above a first threshold (e.g., the upper operating temperature limit) of the field device 102, relatively cooler air can be ducted from the first outlet 112 to the field device 102, and if the temperature measured by the sensor 128 is below a second threshold (e.g., the lower operating temperature limit) of the field device 102, relatively warmer fluid can be ducted from the second outlet 114 to the field device 102.

In the illustrated example, a flow control member or dump valve 208 (e.g., a three-way valve, a three-way pressure regulating valve, a switching valve) is coupled to the passageway 202 and is disposed between the second outlet 114 and the field device 102 to regulate the flow and/or the pressure of the fluid in the passageway 202. The flow control member 208 operates to dump or direct the relatively warmer fluid to the ambient or surrounding air away from the field device 102 when, for example, the first outlet 112 is supplying relatively cooler fluid to the field device 102. For example, if the temperature at or near the field device 102 is above the upper operating temperature limit, and the temperature apparatus 200 is operating to duct the relatively cooler fluid from the first outlet 112 to the field device 102, the flow control member 208 may be moved to a position to direct the warmer fluid ejected from the second outlet 114 to a location away from the field device 102. In other words, the flow control member 208 prevents the warmer fluid from being ducted to the field device 102. In some examples, the warmer fluid at the second outlet 114 is dumped or bled into the atmosphere or surrounding environment.

Similarity, a flow control member or dump valve 210 (e.g., a three-way valve, a three-way pressure regulating valve, a switching valve) is coupled to the passageway 118 and is disposed between the first outlet 112 and the field device 102 to regulate the flow and/or the pressure of the fluid in the passageway 118. In the illustrated example, the flow control member 210 operates to dump or direct the relatively cooler fluid to the atmosphere or surrounding environment when, for example, the second outlet 114 is supplying relatively warmer fluid to the field device 102. For example, if the temperature at and/or near the field device 102 is below the lower operating temperature limit, and the temperature apparatus 200 operates to duct the relatively warmer fluid from the second outlet 114 to the field device 102, the flow control member 210 may be moved to a position to direct the cooler fluid ejected from the first outlet 112 to a location away from the field device 102. In other words, the flow control member 210 prevents the cooler fluid from being ducted to the field device 102. In some examples, the cooler fluid in the passageway 118 is dumped or bled into the atmosphere or the surrounding environment. In some examples, the flow control members 208, 210 may operate to partially allow air into their respective passageways 118, 202 and/or regulate the fluid exiting the first and second outlets 112, 114 to a predetermined pressure.

In the illustrated example, the temperature sensor 128 may be employed to detect or measure the temperature at and/or around the field device 102 and generate a signal corresponding to the measured temperature to the control system 130. The control system 130 receives the signal from the sensor 128 and may be configured to compare the measured temperature to an operating temperature range (e.g., having an upper threshold and a lower threshold) via the comparator 136. In some examples, the comparator 136 may compare the signal provided by the temperature sensor 128 with the operating temperature range provided by a look-up table. For example, the field device 102 may have an operating temperature range of −52° C. to 85° C. If the temperature at or around the field device 102 increases above a threshold such as, for example, above the upper operating temperature limit (e.g., 88° C.), the control system 130 may cause the flow control member 126 to open and supply the compressed fluid to the vortex tube 108, which generates a stream of relatively cooler compressed fluid that is ducted via the passageway 118 to the field device 102. In such an example, the control system 130 may also operate to open the flow control member 210 to allow the cooler fluid to be ducted to the field device 102 and move the flow control member 208 to dump or direct the warmer fluid to the surrounding atmosphere. On the other hand, if the temperature at or around the field device 102 falls below a threshold such as, for example, below the lower operating temperature limit (e.g., −60° C.), the control system 130 may cause the flow control member 126 to open and supply the compressed fluid to the vortex tube 108, which generates a stream of relatively warmer compressed fluid that is ducted via the passageway 202 to the field device 102. In such an example, the control system 130 may also operate to control the flow control member 208 to direct the warmer fluid through the passageway 202 to the field device 102 and operate to control the flow control member 210 to dump or direct the cooler fluid to the surrounding atmosphere. In other examples, other threshold values may be used. In some examples, both of the flow control members 208, 210 may be operated to fully or partially provide fluid to the field device 102 (e.g., to mix the fluid streams to produce a desired temperature). Thus, the temperature apparatus 200 may be used to regulate (e.g., maintain the temperature at and/or near the field device 102 within a set range) the temperature at the field device 102.

In some examples, the vortex tube 108 may be adjusted (e.g., via a valve at the second outlet 114) to affect the flow rates of the streams of fluid at the first and second outlets 112, 114, thereby affecting the temperature of the streams of fluid dispensed from the first and second outlets 112, 114. In some examples, the flow rates of the first and second outlets 112, 114 may be preset (e.g., by pre-setting a valve at the second outlet 114 to a certain position) to provide the maximum hot and/or cold temperatures at the first and second outlets 112, 114. In this manner, the flow control members 208, 210 can then be operated to provide varying amounts of warm and cold fluid to the field device 102 to affect the desired temperature (e.g., via a mixture of the warm and cold fluid). Additionally or alternatively, the vortex tube 108 may be adjusted automatically (e.g., via a controller that adjusts a valve at the second outlet 114) to change the flow rates of the streams of fluid at the first and second outlets 112, 114 and, thus, the temperatures of the streams of fluid at the first and second outlets 112, 114.

Figure 3:
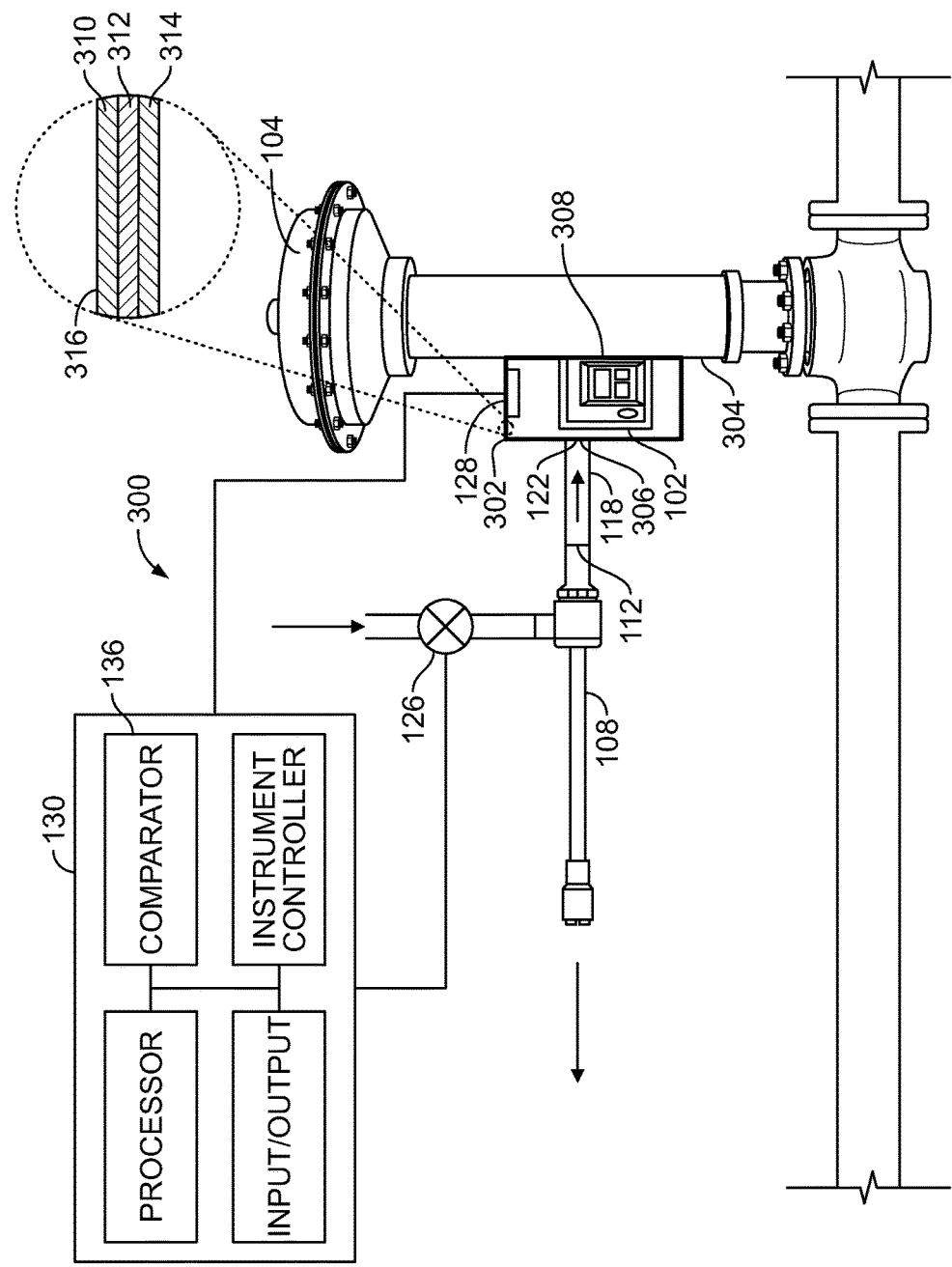
FIG. 3 is a schematic view of another example field device temperature apparatus disclosed herein.

FIG. 3 illustrates another example temperature apparatus 300 described herein. Those components of the example temperature apparatus 300 that are substantially similar or identical to the components of the example temperature apparatus 100 and/or 200 described above and that have functions substantially similar or identical to the functions of those components will not be described in detail again below. Instead, the interested reader is referred to the above corresponding descriptions. To facilitate this process, the same reference numbers will be used for like structures.

Referring to FIG. 3, the example temperature apparatus 300 includes a housing or container 302 coupled to a side 304 of the actuator 104, and the field device 102 is disposed or located within the container 302. The container 302 operates to retain cooler fluid within the container 302 and, thus, in the area proximate the field device 102. In the illustrated example, the second end 122 of the passageway 118 is coupled to the container 302. Specifically, the second end 122 is coupled to a hole or aperture 306 in a wall of the container 302. In some examples, a fitting or connector may be employed to couple the second end 122 of the passageway 118 to the container 302. When the vortex tube 108 generates a cooler stream of fluid at the first outlet 112, the cooler stream of fluid is ducted (via the passageway 118) to the area inside the container 302 (e.g., an internal cavity) to cool or reduce the temperature at and/or around the field device 102. The container 302 enables the cooler fluid to remain relatively cooler and remain relatively closer to the field device 102, rather than dispersing into the surrounding air. In the illustrated example, the container 302 is depicted as a square or rectangular box. However, the container 302 may be implemented as a container or housing having different shapes and/or sizes.

The container 302 may be coupled to the side 304 of the actuator 104 using any mechanical fastener(s) (e.g., bolts, screws, etc.) and/or any other suitable fastening technique (e.g., welding). In the illustrated example, the container 302 includes a hole or aperture 308 (e.g., a through-hole) where any wires, connectors, conduits, etc. from the field device 102 can be fed through and connected to the actuator 104. As disclosed above, the example temperature apparatus disclosed herein may be used with any type of field device. Therefore, depending on what type field device is used, the container 302 may be different sizes and/or shapes and may be attached to any co-pending structure to which the field device 102 is coupled.

In some examples, the walls of the container 302 include or are formed with insulation, which reduces the amount of heat transfer through the walls of the container 302 and helps keep the fluid within the container 302 at the temperature of the fluid entering the container 302 from the vortex tube 108. An enlarged cross-sectional view of the wall of the container 302 is illustrated in FIG. 3. In the illustrated example, the wall of the container 302 includes a multi-layer insulation design. Specifically, the wall includes a first layer 310, a second layer 312 and a third layer 314. The middle or second layer 312 is an insulation material that is disposed (e.g., sandwiched) between the first and third layers 310, 314. In the illustrated example, the second layer 312 is an aerogel (e.g., Pyrogel®), which is relatively soft and/or brittle (e.g., crumbly) in its natural state. To hold the aerogel layer 312 in place, the first layer 310 and the third layer 314 are implemented as relatively durable, rigid layers that sandwich the second layer 312 therebetween. In some examples, the first layer 310 and/or the third layer 314 are formed of a polyimide (PI) or hard fiber, and define the inner and outer surfaces of the container 302. In some examples, the layers 310, 312, 314 are coupled together using adhesive (e.g., glue). However, the layers 310, 312, 314 may be coupled using any other suitable fastening mechanism. In some examples, more or fewer middle layers of insulation (e.g., multiple layers of Pyrogel®) and/or layers of different types of insulation may be implemented (e.g., to affect insulation and/or durability properties based on the desired application).

In some examples, an outer surface 316 of the first layer 310 is coated with a polymer (e.g., neoprene) to reduce the amount of static charge in the container 302. By coating the outer surface 316, the container 302 can be grounded. As a result, the amount of electric static charge in the container is reduced and, therefore, the risk of undesired sparks and/or interference with the electronics of the field device 102 is also reduced. This multi-layer insulation advantageously assists in maintain the fluid inside the container 302 (e.g., in an internal cavity of the container 302) at a constant temperature. Although the multi-layer insulation arrangement is illustrated in connection with the container 302, it is to be understood that this insulation arrangement can be implemented in other applications that utilize insulation to reduce the amount of heat transfer.

In the illustrated example, the temperature sensor 128 is disposed within the container 302 (e.g., on an inner surface or wall of the container 302) to detect and/or measure the temperature of the fluid around the field device 102. In other examples, the temperature sensor 128 is incorporated into the field device 102. In an example operation, the control system 130 receives a signal from the sensor 128 and compares the measured temperature to a pre-determined value (e.g., a threshold) to determine whether to duct the relatively cooler fluid to the container 302. An example of such an operation is disclosed above in connection with the example temperature apparatus 100. However, rather than ducting the cooler fluid directly to the field device 102, the fluid is ducted to the container 302.

Figure 4:
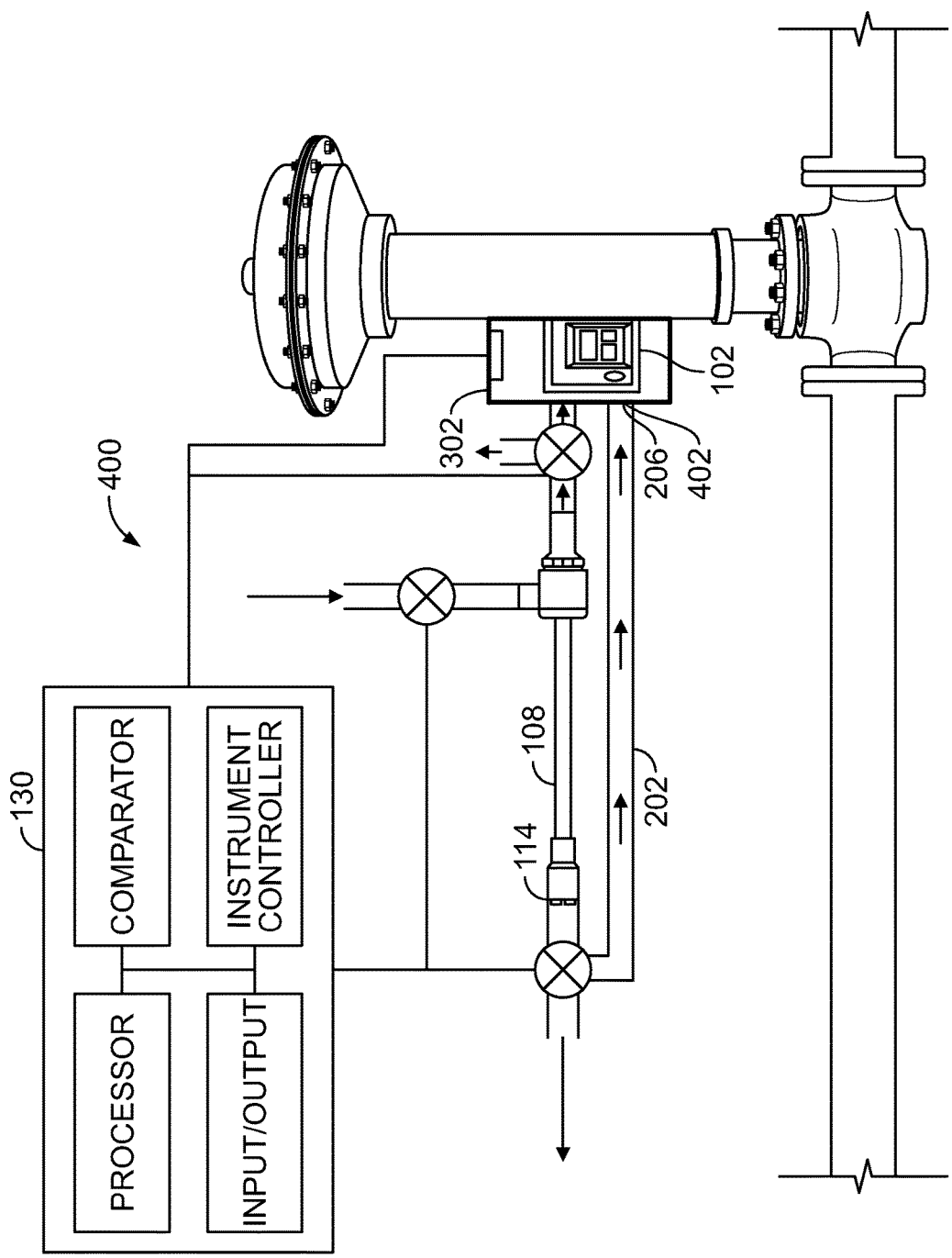
FIG. 4 is a schematic view of another example field device temperature apparatus disclosed herein.

FIG. 4 illustrates another example temperature apparatus 400 described herein. Those components of the example temperature apparatus 400 that are substantially similar or identical to the components of the example temperature apparatus 100, 200 and/or 300 described above and that have functions substantially similar or identical to the functions of those components will not be described in detail again below. Instead, the interested reader is referred to the above corresponding descriptions. To facilitate this process, the same reference numbers will be used for like structures.

Similar to the example temperature apparatus 200 disclosed above, the example temperature apparatus 400 illustrated in FIG. 4 includes the passageway 202 to enable the vortex tube 108 to provide the warmer fluid to the field device 102. In the illustrated example, the passageway 202 is coupled between the second outlet 114 and the container 302. Specifically, the second end 206 is coupled to a hole or aperture 402 in a wall of the container 302. In some examples, a fitting or connector may be employed to couple the second end 206 of the passageway 202 to the container 302. The passageway 202 fluidly couples the second outlet 114 and the field device 102 to supply the relatively warmer fluid generated by the vortex tube 108 to warm or increase the temperature of the air inside the container 302. The container 302 enables the warmer fluid to remain relatively warmer and remain relatively closer to the field device 102, rather than dispersing into the surrounding air. The temperature apparatus 400 may be controlled to warm or cool the air inside the container 302. An example of such a controlling operation is disclosed above in connected with the example temperature apparatus 200. However, rather than ducting the compressed fluid directly to the field device 102, the fluid is ducted to the container 302.

Figure 5:
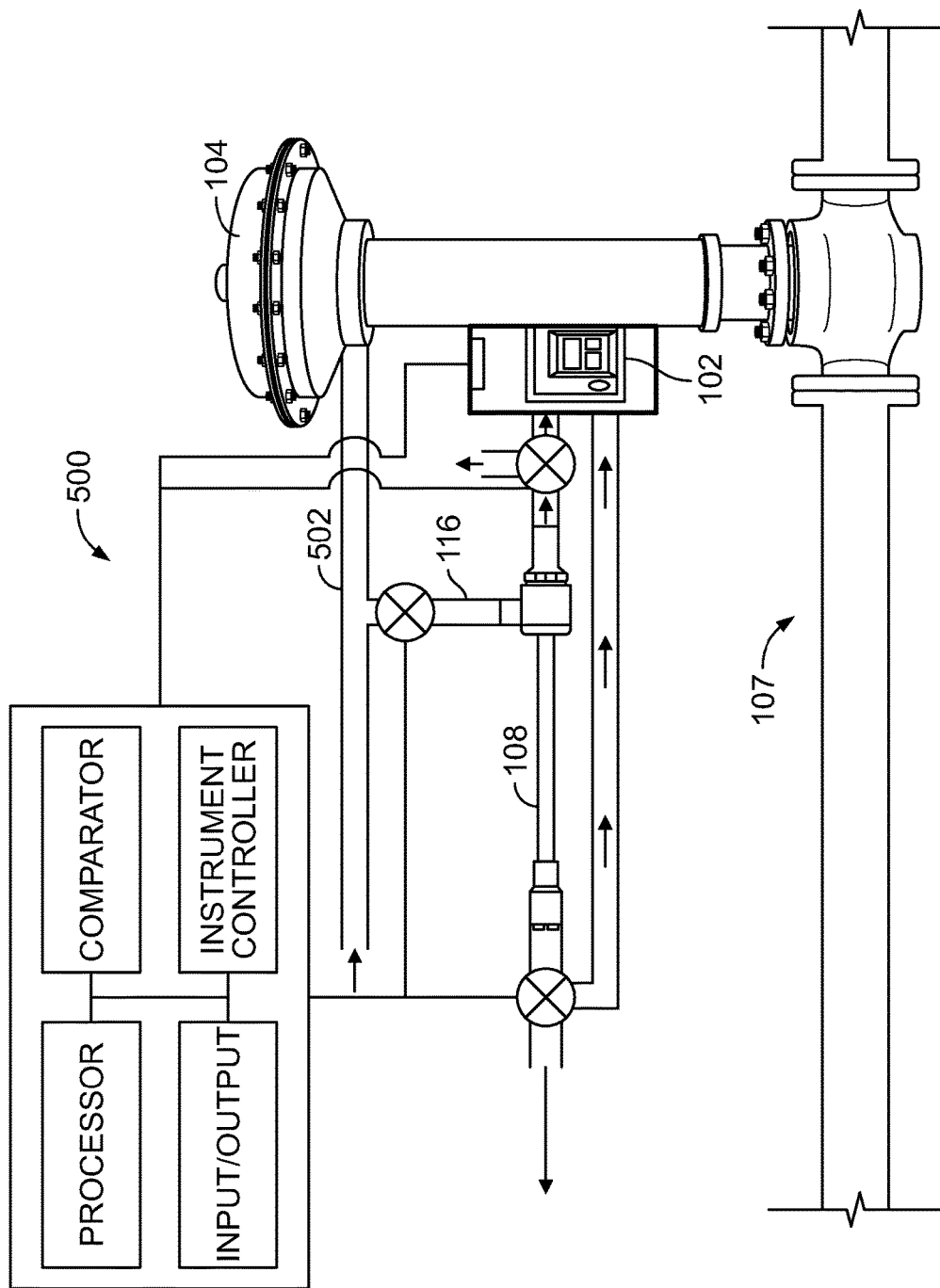
FIG. 5 is a schematic view of another example field device temperature apparatus disclosed herein.

FIG. 5 illustrates another example temperature apparatus 500 described herein. Those components of the example temperature apparatus 500 that are substantially similar or identical to the components of any of the example temperature apparatus 100, 200, 300 and/or 400 described above and that have functions substantially similar or identical to the functions of those components will not be described in detail again below. Instead, the interested reader is referred to the above corresponding descriptions. To facilitate this process, the same reference numbers will be used for like structures.

In the illustrated example of FIG. 5, a conduit or passageway 502 is employed to provide compressed fluid to the actuator 104. As described above, in some examples compressed air is used to operate different instruments (e.g., pneumatic actuators) in the process system 107. In the illustrated example, the passageway 116 is fluidly coupled to the passageway 502. Thus, fluid (e.g., compressed air) from the same source is used to operate the actuator 104 (e.g., a pneumatic actuator) and affect (e.g., increase and/or decrease) the temperature of the field device 102 (via the vortex tube 108). This arrangement may be implemented with any of the example temperature apparatus 100, 200, 300 and/or 400 disclosed above.

While an example manner of implementing the temperature apparatus 100, 200, 300, 400, 500 of FIGS. 1-5 is illustrated in the control system 130 of FIGS. 1-5, one or more of the elements, processes and/or devices illustrated in the control system 130 of FIGS. 1-5 may be combined, divided, re-arranged, omitted, eliminated and/or implemented in any other way. Further, the example processor 132, the example input/output module 134, the example comparator 136, the example instrument controller 138 and/or, more generally, the example control system 130 of FIGS. 1-5 may be implemented by hardware, software, firmware and/or any combination of hardware, software and/or firmware. Thus, for example, any of the example processor 132, the example input/output module 134, the example comparator 136, the example instrument controller 138 and/or, more generally, the example control system 130 of FIGS. 1-5 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example processor 132, the example input/output module 134, the example comparator 136 and/or the example instrument controller 138 is/are hereby expressly defined to include a tangible computer readable storage device or storage disk such as a memory, a digital versatile disk (DVD), a compact disk (CD), a Blu-ray disk, etc. storing the software and/or firmware. Further still, the example control system 130 of FIGS. 1-5 may include one or more elements, processes and/or devices in addition to, or instead of, those illustrated in FIGS. 1-5, and/or may include more than one of any or all of the illustrated elements, processes and devices.

Additionally, one or more of the example processor 132, the example input/output module 134, the example comparator 136, the example instrument controller 138 and/or, more generally, the example control system 130 of FIGS. 1-5 may communicate with one or more of the sensor 128 or the flow control member(s) 126, 208, 218 using any type of wired connection (e.g., a databus, a USB connection, etc.) or a wireless communication mechanism (e.g., radio frequency, infrared, etc.) using any past, present or future communication protocol (e.g., Bluetooth, USB 2.0, USB 3.0, etc.). Further, one or more of the sensor 128 or the flow control member(s) 126, 208, 218 of FIGS. 1-5 may communicate with each other using such wired connection or wireless communication mechanism.

Figure 6:
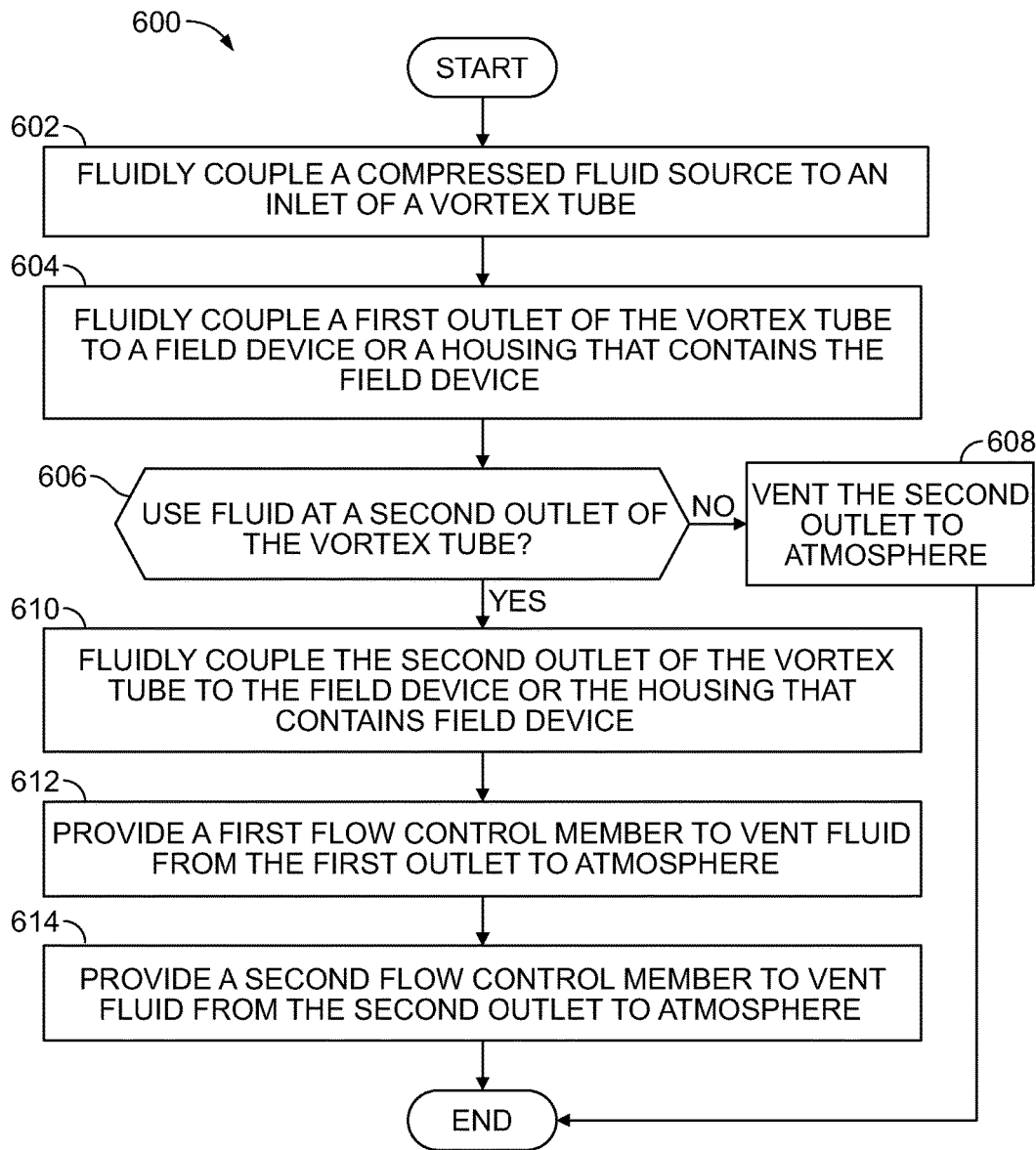
FIG. 6 is a flowchart illustrating an example method of implementing the example field device temperature apparatus of FIGS. 1-5.
Figure 7:
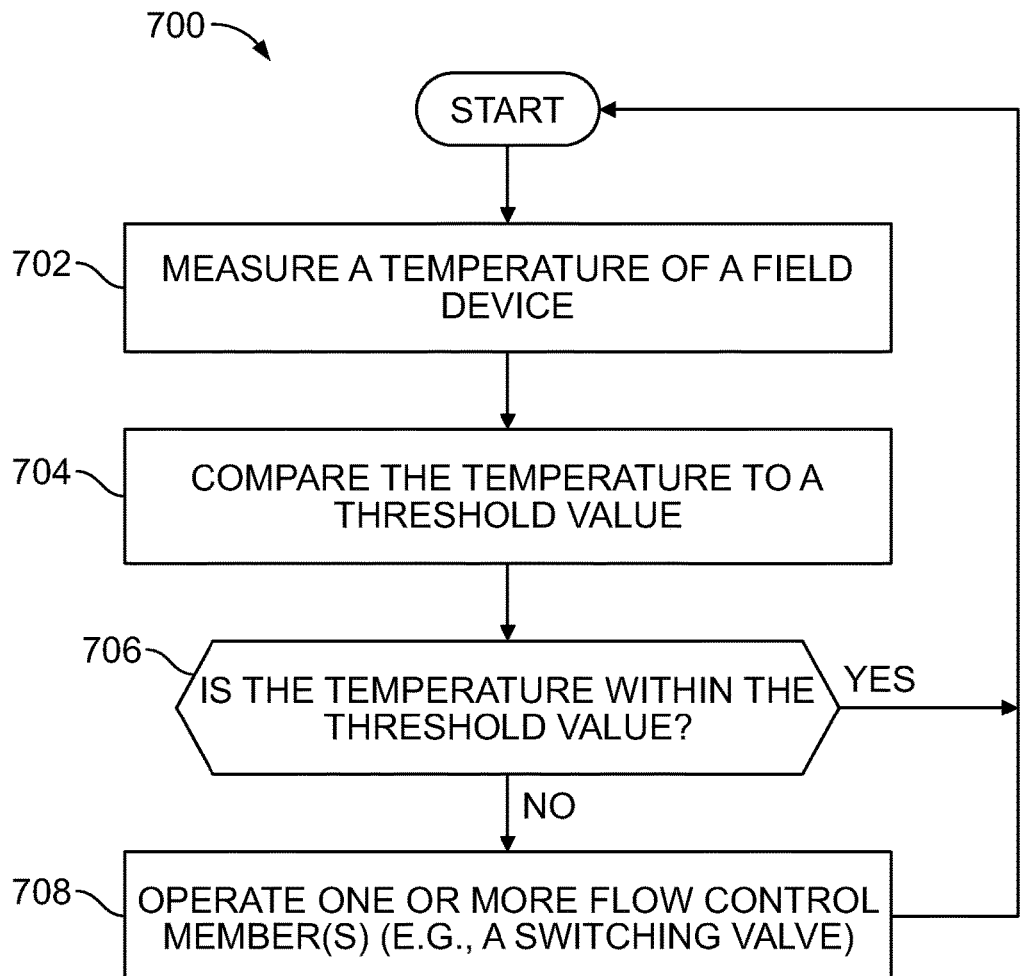
FIG. 7 is a flowchart representative of an example method that may be performed by the example field device temperature apparatus of FIGS. 1-5.

Flowcharts representative of example methods for implementing the example control system 130 of FIGS. 1-5 is shown in FIGS. 6 and 7. In this example, at least a portion of the methods may be implemented using machine readable instructions that comprise a program for execution by a processor such as the processor 812 shown in the example processor platform 800 discussed below in connection with FIG. 8. The program may be embodied in software stored on a tangible computer readable storage medium such as a CD-ROM, a floppy disk, a hard drive, a digital versatile disk (DVD), a Blu-ray disk, or a memory associated with the processor 812, but the entire program and/or parts thereof could alternatively be executed by a device other than the processor 812 and/or embodied in firmware or dedicated hardware. Further, although the example program is described with reference to the flowcharts illustrated in FIGS. 6 and 7, many other methods of implementing the example control system 130 of FIGS. 1-5 may alternatively be used. For example, the order of execution of the blocks may be changed, and/or some of the blocks described may be changed, eliminated, or combined.

As mentioned above, at least a portion of the example methods of FIGS. 6 and 7 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example methods of FIGS. 6 an 7 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

FIG. 6 illustrates an example flowchart representative of an example method 600 to implement one or more of the example temperature apparatus 100, 200, 300, 400, 500 disclosed above. The example method 600 includes fluidly coupling a compressed or pressurized fluid (e.g., air) source to an inlet of a vortex tube (block 602). For example, in the temperature apparatus 100 disclosed above, the passageway 116 fluidly couples the inlet 110 of the vortex tube 108 to a compressed fluid source. In some examples, compressed fluid source is designated solely for supplying compressed fluid to the vortex tube. In other examples, such as disclosed in the example temperature apparatus 500, the compressed fluid may be supplied by compressed air (e.g., plant air) that is used to operate other components of the process control system (e.g., valves, actuators, etc.).

The example method 600 includes fluidly coupling a first outlet of the vortex tube to a field device or a housing that contains the field device (block 604). As described above, vortex tubes convert a stream of compressed inlet air into a stream of relatively warmer air and a stream of relatively cooler air. Typically, a vortex tube has two outlets, one outlet for each stream. In the example method 600, the first outlet (e.g., the cooler air outlet) is fluidly coupled to the field device or the housing that contains the field device. For example, in the temperature apparatus 100 disclosed above, the first outlet 112 is fluidly coupled to the field device 102 via the passageway 118. In other examples, such as in the temperature apparatus 300 disclosed above, the first outlet 112 of the vortex tube 108 is fluidly coupled to the container 302 that contains or houses the field device 102.

In the illustrated example, the method 600 includes deciding whether to use the fluid at the second outlet of the vortex tube (block 606). In some examples, only one of the outlets of the vortex tube is fluidly coupled to the field device or the housing (e.g., to either warm or cool the field device). If the fluid from the second outlet is not to be used, the method 600 includes venting or directing the second outlet to the atmosphere or surrounding air (block 608). For example, in the temperature apparatus 100 disclosed above, the second outlet 114 of the vortex tube 108 is vented or directed into the atmosphere or surrounding air.

If the fluid at the second outlet is to be utilized, the method 600 includes fluidly coupling the second outlet of the vortex tube to the field device or to the housing that contains the field device (block 610). For example, in the temperature apparatus 200 disclosed above, the second outlet 114 of the vortex tube 108 is fluidly coupled to the field device 102 via the passageway 202. In other examples, such as in the temperature apparatus 400 disclosed above, the second outlet 114 of the vortex tube 108 is fluidly coupled to the container 302 that contains or houses the field device 102.

The example method 600 includes providing a first flow control member to vent fluid from the first outlet to the atmosphere or surrounding air (block 612). When the fluid from the second outlet is being supplied to the field device or housing (e.g., to warm or increase the temperature of the field device), the first outlet is still producing a cooler stream of fluid. Thus, the first flow control member vents or directs the cooler stream of fluid elsewhere (e.g., to the atmosphere or surrounding air). For example, in the temperature apparatus 200 disclosed above, the flow control member 210 operates to direct the fluid from the first outlet 112 either to the field device 102 or to the atmosphere or surrounding air.

The example method 600 includes providing a second flow control member to vent fluid from the second outlet to the atmosphere or surrounding air (block 612). Contrary to the example above, when the fluid from the first outlet is being supplied to the field device or housing (e.g., to warm or increase the temperature of the field device), the second outlet is still outputting a cooler stream of fluid. Thus, the second flow control member vents or directs the warmer stream of fluid elsewhere (e.g., to the atmosphere or surrounding air). For example, in the temperature apparatus 200 disclosed above, the flow control member 208 operates to direct the fluid from the second outlet 114 either to the field device 102 or to the atmosphere or surrounding air.

FIG. 7 illustrates a flowchart representative of an example method 700 that may be implemented to change/control the temperature at or around a field device using a field device temperature apparatus such as, for example, the temperature apparatus 100, 200, 300, 400 and/or 500 of FIGS. 1-5 and/or a control system such as the control system 130 of FIGS. 1-5. The example method 700 includes measuring a temperature of a field device (block 702). In some examples, a temperature sensor is employed to measure the temperature at and/or around the field device. For example, in the temperature apparatus 100 disclosed above, the sensor 128 measures or detects the temperature of the field device at and/or around the field device 102. In some examples, the sensor is incorporated into the field device (e.g., a thermostat of the field device). In other examples, such as in the temperature apparatus 300, the temperature sensor 128 is coupled to the inside of the container 302 and measures or detects the temperature of the air surrounding the field device 102. In the example temperature apparatus 100, 200, 300, 400 and/or 500, the control system 130 receives a signal from the temperature sensor 128 via the input/output module 134.

The example method 700 includes comparing the temperature to a threshold value (block 704). For example, in the temperature apparatus 100, 200, 300, 400 and/or 500, the comparator 136 of the control system 130 may be configured to compare the temperature detected by the sensor 128 to a threshold value retrieved from a look-up table. In some examples, the threshold value is based on the type of field device, the environment where the field device is located, the operating temperature range of the field device, and/or other factors of the process control system. In some examples, the threshold value is the upper operating temperature limit or the lower operating temperature limit of the field device. In other examples, the threshold may be set to a value above or below the upper operating temperature limit or the lower operating temperature limit of the field device. In some examples, the method includes comparing the measured temperature to a first threshold (e.g., an upper threshold temperature value) and a second threshold (e.g., a lower threshold temperature value).

The example method 700 includes determining if the temperature is within the threshold value (block 706). For example, in the temperature apparatus 100, 200, 300, 400 and/or 500, the processor 132 and/or the comparator 136 may be used to determine if the temperature measured by the sensor 128 is within the threshold value. If the temperature is within the threshold value (e.g., less than 85° C. and/or above −52° C.), the control system 130 returns to the beginning of the method 700 and continues to measure the temperature of the field device (block 702). For example, in the temperature apparatus 100, if the temperature is below a pre-determined or threshold value, the control system 130 may cause the flow control member 126 to remain in the closed position, so that cooler fluid is not provided to the field device.

If the temperature is not within the threshold value, the example method 700 includes operating one or more flow control members (708). For example, if the control system 130 determines the temperature is not within the threshold value (e.g., the temperature is higher than the threshold temperature or upper operating limit), the control system 130 may command one or more of the flow control members 126, 208, 210 to move to an open or closed position to supply compressed fluid to the vortex tube 108 and, thus, provide cooler air or warmer air to the field device 102. In some examples, the compressed fluid is supplied via plant air that is also used to supply compressed air to various instruments and equipment of the process control system. Thus, in some examples, the method 700 includes using the fluid to also operate an instrument (e.g., an actuator) in a process control system. In some examples, the control system 130 continues to measure the temperature of the field device and, when the temperature is within the threshold value, the control system 130 may command one or more of the flow control members 126, 208, 210 to close to stop the vortex tube 108 from supplying the relatively warmer or cooler fluid to the field device.

Figure 8:
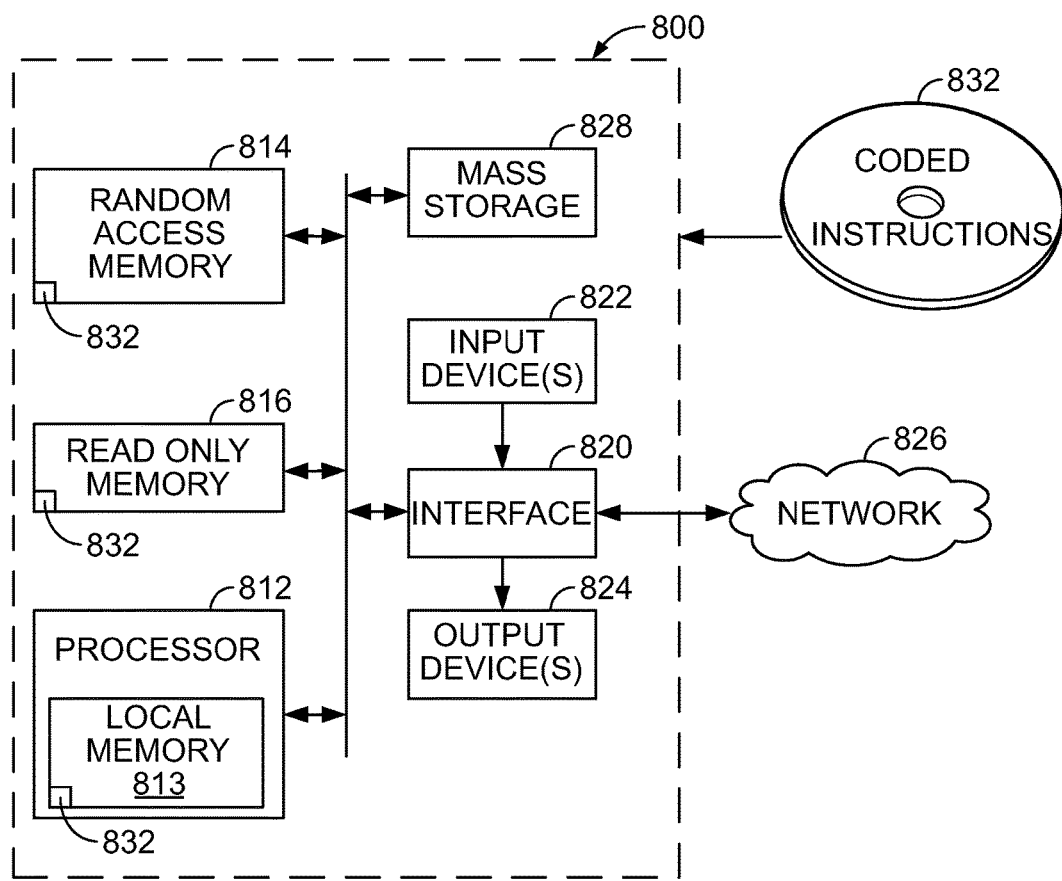
FIG. 8 is a diagram of a processor platform for use with the examples disclosed herein.

FIG. 8 is a block diagram of an example processor platform 800 capable of executing instructions to implement at least a portion of the methods of FIGS. 6 and 7 and to implement the control system 130 of FIGS. 1-5. The processor platform 800 can be, for example, a server, a personal computer, a mobile device (e.g., a cell phone, a smart phone, a tablet such as an iPad™), a personal digital assistant (PDA), an Internet appliance or any other type of computing device.

The processor platform 800 of the illustrated example includes a processor 812. The processor 812 of the illustrated example is hardware. For example, the processor 812 can be implemented by one or more integrated circuits, logic circuits, microprocessors or controllers from any desired family or manufacturer.

The processor 812 of the illustrated example includes a local memory 813 (e.g., a cache). The processor 812 of the illustrated example is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 816 may be implemented by flash memory and/or any other desired type of memory device. Access to the main memory 814, 816 is controlled by a memory controller.

The processor platform 800 of the illustrated example also includes an interface circuit 820. The interface circuit 820 may be implemented by any type of interface standard, such as an Ethernet interface, a universal serial bus (USB), and/or a PCI express interface.

In the illustrated example, one or more input devices 822 are connected to the interface circuit 820. The input device(s) 822 permit(s) a user to enter data and commands into the processor 812. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 824 are also connected to the interface circuit 820 of the illustrated example. The output devices 824 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 820 of the illustrated example, thus, typically includes a graphics driver card, a graphics driver chip or a graphics driver processor.

The interface circuit 820 of the illustrated example also includes a communication device such as a transmitter, a receiver, a transceiver, a modem and/or network interface card to facilitate exchange of data with external machines (e.g., computing devices of any kind) via a network 826 (e.g., an Ethernet connection, a digital subscriber line (DSL), a telephone line, coaxial cable, a cellular telephone system, etc.).

The processor platform 800 of the illustrated example also includes one or more mass storage devices 828 for storing software and/or data. Examples of such mass storage devices 828 include floppy disk drives, hard drive disks, compact disk drives, Blu-ray disk drives, RAID systems, and digital versatile disk (DVD) drives.

Coded instructions 832 to implement at least a portion of the methods of FIGS. 6 and 7 may be stored in the mass storage device 828, in the volatile memory 814, in the non-volatile memory 816, and/or on a removable tangible computer readable storage medium such as a CD or DVD.

From the foregoing, it will be appreciated that the above disclosed temperature apparatus and methods provide relatively warmer or cooler fluid to a field device to increase and/or decrease the temperature of the field device to within an operating temperature range. As a result, the field device can operate in climates have warmer or cooler conditions while reducing the amount of wear that the field device typically incurs, thereby increasing the operating life the field device. Also, the above disclosed apparatus and methods utilize a vortex tube that operates off of compressed fluid such as, for example, plant air. Therefore, the apparatus may operate in locations with little or no electrical power supplies.

Although certain example apparatus and methods, and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
   a vortex tube comprising:
   an inlet to receive a fluid;
   a first outlet to dispense a first portion of the fluid at a first temperature; and
   a second outlet to dispense a second portion of the fluid at a second temperature,
   the second temperature to being greater than the first temperature; and
   a first passageway fluidly coupled to the first outlet to direct the first portion of the fluid to an electronic device disposed within a housing in a process control system to affect a temperature of the electronic device in the housing.

2. The apparatus of claim 1, wherein the first passageway is fluidly coupled to the housing to supply the first portion of the fluid at the first temperature to the housing to affect the temperature of the electronic device.

3. The apparatus of claim 1, wherein the device is used to at least one of control or measure a parameter of a pneumatic actuator operatively coupled to a valve in the process control system.

4. The apparatus of claim 3, wherein the fluid received at the inlet of the vortex tube is from the same source of fluid used to operate the pneumatic actuator.

5. An apparatus comprising a vortex tube comprising:
   an inlet to receive a fluid;
   a first outlet to dispense a first portion of the fluid at a first temperature; and
   a second outlet to dispense a second portion of the fluid at a second temperature,
   the second temperature being greater than the first temperature;
   a first passageway fluidly coupled to the first outlet to direct the first portion of the fluid to an electronic device disposed in a housing in a process control system to affect a temperature of the electronic device; and
   a first switching valve disposed in the first passageway, the first switching valve to direct the first portion of the fluid to the housing or to the atmosphere.

6. The apparatus of claim 5 further comprising a second passageway to fluidly couple the second outlet to the housing to supply the second portion of the fluid at the second temperature to the housing to affect the temperature of the device.

7. The apparatus of claim 6 further comprising a second switching valve disposed in the second passageway, the second switching valve to direct the second portion of the fluid to the housing or to the atmosphere.

8. An apparatus comprising:
   a housing to contain an electronic device of a process control system;
   a vortex tube that is to divert a first portion of a fluid to a first outlet of the vortex tube and a second portion of the fluid to a second outlet of the vortex tube; and
   a first passageway to fluidly couple the first outlet to the housing to supply the first portion of the fluid to an internal cavity of the housing; and
   a second passageway to fluidly couple the second outlet to the housing to supply the second portion of the fluid to the internal cavity of the housing.

9. The apparatus of claim 8 further comprising a flow control member disposed within the second passageway to regulate the flow of the second portion of the fluid to the internal cavity of the housing.

10. The apparatus of claim 8 further comprising a sensor to measure a temperature within the internal cavity of the housing.

11. The apparatus of claim 10, wherein the sensor is integrated into the electronic device.

12. The apparatus of claim 8 further comprising a flow control member to regulate a flow of the fluid into an inlet of the vortex tube.

13. The apparatus of claim 8, wherein the device comprises a dielectric elastomer transducer.

14. A method comprising:
    measuring a first temperature proximate a field instrument in a process control system;
    comparing the first temperature to a first threshold; and
    operating a vortex tube to supply fluid at a second temperature to the field instrument when the first temperature is above the first threshold, the second temperature lower than the first temperature, the vortex tube comprising an inlet that is to receive the fluid, a first outlet that is to dispense a first portion of the fluid at the second temperature, and a second outlet that is to dispense a second portion of the fluid at a third temperature, the third temperature higher than the second temperature.

15. The method of claim 14, wherein the vortex tube is to supply the first portion of the fluid at the second temperature to a housing that contains the field instrument.

16. The method of claim 14, wherein the first temperature is to be measured by a thermostat of the field instrument.

17. The method of claim 14 further comprising:
    comparing the first temperature to a second threshold; and
    operating the vortex tube to supply the second portion of the fluid at the third temperature to the field instrument when the first temperature is below the second threshold.

18. The method of claim 14, wherein operating the vortex tube comprises opening a valve to direct the fluid into the inlet of the vortex tube.

19. The method of claim 14, wherein the fluid received at the inlet of the vortex tube is supplied by a source, the method further comprising using the fluid from the source to operate an actuator in the process control system.

* * * * *